M. M. MAINE.
SAW TABLE AND FEEDING APPARATUS.
APPLICATION FILED MAY 17, 1909.
975,970.
Patented Nov. 15, 1910.
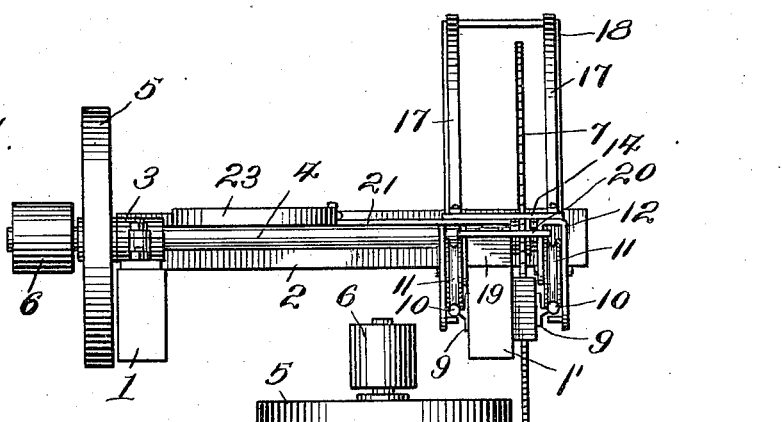
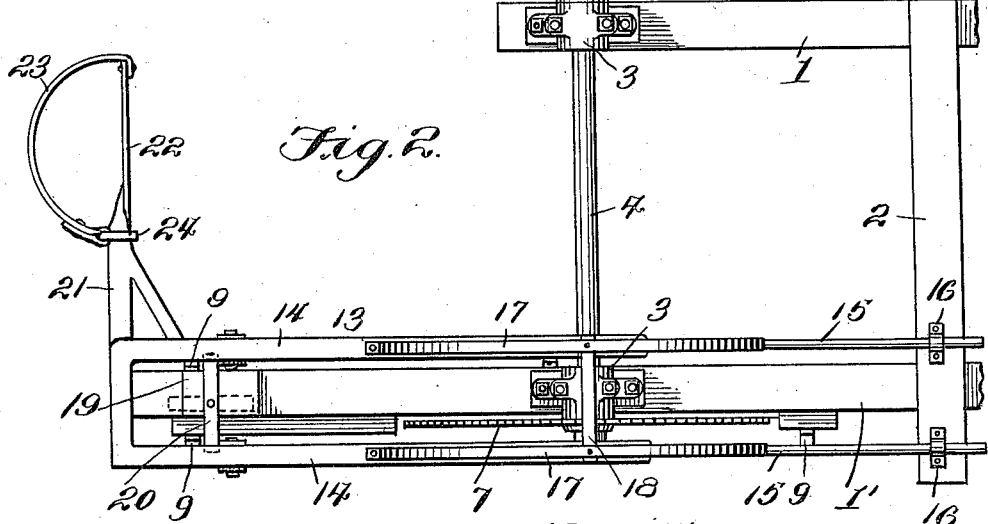
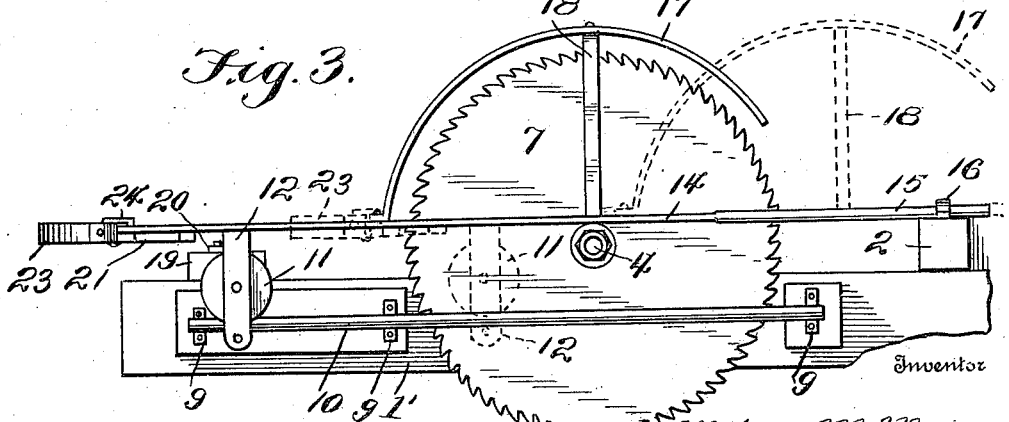
Witnesses
J. T. L. Wright
Inventor
Milton M. Maine
By Victor J. Evans
Attorney

UNITED STATES PATENT OFFICE.

MILTON M. MAINE, OF PORTLAND, OREGON.

SAW-TABLE AND FEEDING APPARATUS.

975,970.

Specification of Letters Patent.  Patented Nov. 15, 1910.

Application filed May 17, 1909. Serial No. 496,069.

*To all whom it may concern:*

Be it known that I, MILTON M. MAINE, a citizen of the United States, residing at Portland, in the county of Multnomah and State of Oregon, have invented new and useful Improvements in Saw-Tables and Feeding Apparatus, of which the following is a specification.

This invention relates to saw tables and feeding apparatus, and has for an object to provide a table having a revoluble saw therein, and a feed carriage for supporting the slab or material to be cut by the saw, and to provide the said carriage with means so that it can be manually operated, thus providing means whereby in operation the hands of the operator can be utilized in the handling of the material to be cut and for holding the same in its correct position upon the carriage.

A still further object of my invention resides in the fact that the manually controlled means for operating or removing the carriage also serves as means for checking the recoil of the carriage after material has been cut.

Other objects and advantages will be apparent as the nature of the invention is better set forth, and it will be understood that changes within the scope of the claims may be resorted to without departing from the spirit of the invention.

In the drawing, forming a portion of this specification and in which like numerals of reference indicate similar parts in the several views:—Figure 1 is a rear end view of the saw table and feeding apparatus. Fig. 2 is a top plan view. Fig. 3 is a side elevation.

Referring now more particularly to the drawing, there is shown a saw table and feeding apparatus comprising a frame formed from parallel spaced longitudinally extending members 1 and 1' connected to each other by a transverse horizontally disposed member 2. The said members 1 and 1' of the frame are provided with journal boxes 3 in which a shaft 4 is revolubly mounted. The shaft 4 is provided adjacent to one end with a fly wheel 5 and outwardly of the fly wheel with a pulley 6 which may be belted to a suitable motor, (not shown). At the other end the shaft is provided with a circular saw 7 disposed outwardly of the member 1'. The member 1' has extending therefrom at the sides a plurality of brackets 9 which have secured thereto parallel spaced rails 10 upon which pulleys 11 are mounted which are carried by depending yokes 12 carried by a feed table 13 provided with spaced parallel arms 14 provided at their outer extremities with cylindrical rods or the like 15. The rods 15 are slidably mounted in brackets 16 secured to the member 2 of the table frame.

The construction of the table 13 is such that the arms 14 thereof are disposed at the sides of the saw 7 and in spaced relation thereto and are disposed at right angles to the shaft 4 so that they can be moved transversely thereof in a manner to be hereinafter explained. The arms 14 are provided with a pair of arcuate saw guards 17 which are connected to each other by means of a yoke 18 secured to the arms 14. The member 1' has secured thereto adjacent to its rear end a block 19 upon which is pivotally mounted a stop 20 adapted to engage the yokes 12 carried by the table 14 so as to limit the rearward movement of the same to effectively prevent the pulleys 11 engaging the brackets 9 adjacent to the front end of the member 1' as will be readily understood.

The carriage 13 has secured thereto in any suitable manner a bracket 21 provided with a horizontally disposed arm 22 to which is connected one end of a strap or suitable flexible connection 23, the other end of said strap or connection being provided with a hook 24 adapted to be engaged with the bracket 21.

In operation, a slab of material to be cut is placed transversely upon the carriage 13, and the strap or connection 23 is passed around the leg of the operator of the apparatus so that the carriage can be effectively moved to bring the slab of material into engagement with the saw 7. The construction herein described is such that the apparatus can be manually operated and the movement of the carriage controlled by the leg of the operator thus allowing him to freely manipulate with his hands the material to be sawed.

The yokes 12 are provided with horizontal guard pins 28 which extend under the rails 10 so as to hold the rollers 11 against displacement from the rails and to insure a perfect sliding movement of the carriage. The arrangement of the pins is such that the guide rods 15 are held against buckling or binding in the brackets 16.

I claim:—

A saw table and feeding apparatus comprising supporting rails, a carriage movably mounted on the table and provided with depending yokes with rollers to travel on said rails, a stop pivotally mounted on the table and located in the path of the yokes to engage the same to limit the movement of the carriage in one direction, brackets mounted on the table, spaced guide rods carried by the carriage and movable through the brackets, a revolving saw mounted on the table and extending vertically between the sides of the carriage, and guard pins carried by the yokes and extending beneath the said rails to engage them so as to hold the guide rods against buckling in the brackets and to hold the rollers against displacement from the supporting rails.

In testimony whereof I affix my signature in presence of two witnesses.

MILTON M. MAINE.

Witnesses:
MAHLON PURDIN,
WILLIAM IRA VAWTER.